March 22, 1938.  E. F. KING  2,111,933
METHOD FOR TREATING FIBROUS MATERIALS
Filed Oct. 26, 1935
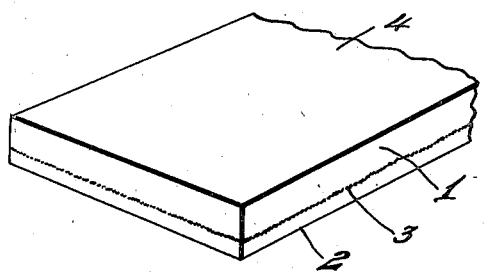
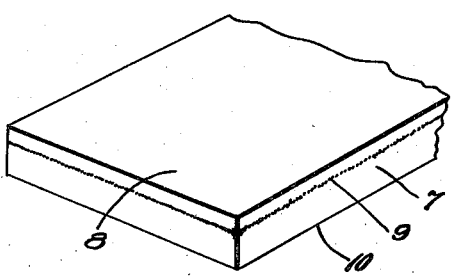
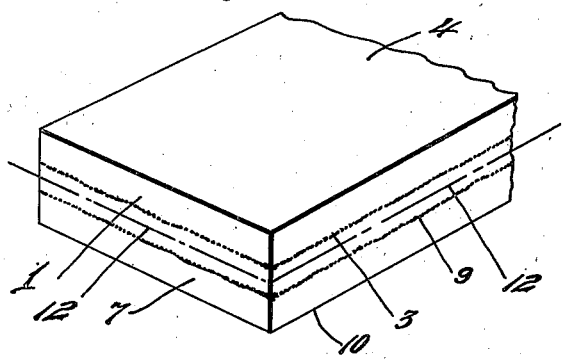
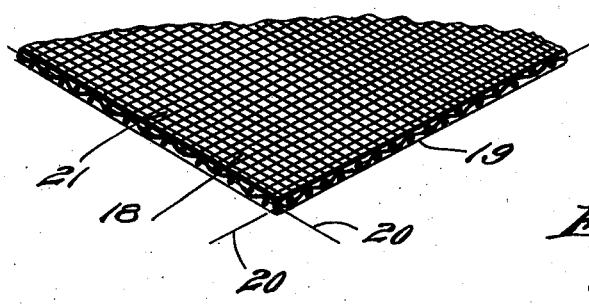
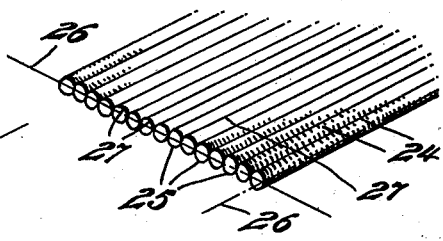
Inventor
Edward F. King
By Perley H. Plant.
Attorney Patented Mar. 22, 1938

2,111,933

UNITED STATES PATENT OFFICE 2,111,933

METHOD FOR TREATING FIBROUS MATERIALS

Edward F. King, Cranston, R. I.

Application October 26, 1935, Serial No. 46,850

12 Claims. (Cl. 91—68)

This invention relates to a method for treating fibrous materials, and more particularly to a method for applying rubber thereto in such a manner as to effect a controlled deposition of rubber particles substantially completely filling certain areas of the material or arranged in definite predetermined zones or portions of the fibrous material.

Many methods have been suggested heretofore for rubberizing various forms of woven and unwoven fibrous material, certain of which methods have met with greater or less commercial success, dependent upon the materials employed and the purposes for which the product was found to be capable of use. In general, such methods may be classified as those employing either a rubber solvent solution or an aqueous dispersion of rubber such as is exemplified in the natural latex. In the use of a rubber solution for this purpose, difficulty is experienced in obtaining penetration of a fibrous body by the rubber particles except to a very limited degree, and the resulting material contains only a low percentage of rubber in the form of a surface impregnation by reason of the difficulty in securing penetration and the low percentage of rubber contained in such a solution. In the use of aqueous dispersions of rubber, such as natural or prepared latices, penetration is more readily obtainable but difficulty is encountered in retaining a high concentration of rubber within the material because of its high initial fluidity and the fact that coagulation, which occurs first at or adjacent to the surfaces of the material, effectively prevents penetration by later added latex and obstructs the building up of a compact rubber body substantially filling the interstices throughout the material.

So far as I am aware, no method has heretofore been devised by which a controlled deposition of rubber particles within a fibrous material can be effected in such a manner that the rubber particles are capable of being deposited in the material substantially within predetermined areas or zones having more or less definite limits. Nor has it been possible to secure a high concentration of the rubber particles so as to substantially completely fill the interstices except within narrow limits and at points adjacent to the surfaces of the material and at locations generally beyond the power of the operator to control.

Among the objects of the present invention is the elimination of the above enumerated disadvantages and others found to be inherent in the processes heretofore employed, and the provision of means for controlling the deposition of the rubber particles from an aqueous dispersion of rubber within a more or less limited and defined area within the material, and to provide a method for building up a more or less controlled concentration of rubber particles in the interstices of the material within the area in question so as to form a body of the desired rubber concentration at any suitable point within the material to be treated.

Another object of the invention is the provision of means for effecting the coagulation of a coagulatable aqueous dispersion of rubber at substantially any desired point in a layer of fibrous material while at the same time permitting the ready elimination of the liquid constituents of such compound from the material substantially without obstruction.

A further object of the invention is the provision of means for effecting the coagulation of a coagulatable aqueous dispersion of rubber or latex at a point within the body of a fibrous mass while at the same time permitting the elimination of the separable liquid constituents of such dispersion from the material without obstruction by the coagulum.

Another object of the invention is the provision of a method for initiating the coagulation of latex from a point within the body of a fibrous mass and effecting the progressive coagulation of the same in one direction relative to the point of its initiation.

Another object of the invention is the provision of a process for treating fibrous materials with latex by which the concentration and location of the deposit of rubber particles in a rubber impregnated fibrous material may be varied and controlled within wide limits by varying in a suitable manner the relative quantities and percentage strengths both of the latex and the coagulant.

A further object of the invention is the provision of a method for effecting a controlled coagulation of liquid latex in a fibrous material wherein the control is effective for limiting penetration of the material by the latex in one direction and for causing a progressive coagulation of said latex in the opposite direction.

Another object of the invention is the provision of means for initiating the coagulation of an aqueous dispersion of rubber from a point within a permeable body upon its impregnation by said aqueous dispersion.

Other objects and advantages of the invention relate to various improved method steps and combinations and arrangements of steps for carrying out the process as will be more fully set forth in the detailed description to follow.

In the accompanying drawing are shown, somewhat diagrammatically and for the purpose of illustration rather than limitation, certain types of fibrous material indicating generally stages which may be reached in carrying out the process, as follows:—

Fig. 1 is a perspective view of a portion of an unwoven sheet of fibrous material illustrating one mode of carrying out the invention by effecting limited penetration of the sheet upon one side with a suitable coagulating agent, and indicating the position and relative density of the coagulum formed when latex is absorbed into the material from the opposite side of the sheet, Fig. 2 is a perspective view of a portion of a sheet of similar character to that shown in Fig. 1, in which the location of the coagulant impregnated and latex absorbent sides are reversed, Fig. 3 is a perspective view of a portion of a composite sheet, such as may be formed by superposing upon each other the sheets shown in Figs. 1 and 2, with the coagulant impregnated sides arranged in juxtaposition, Fig. 4 is a perspective view of a portion of a sheet of woven fabric material, which like the sheets shown in Figs. 1 and 2, has been impregnated upon one side with a coagulant and to the opposite side of which latex has been applied, indicating one location which may be selected as the plane of juncture of the coagulant and applied latex, and, Fig. 5 is a perspective view of a series of unwoven cords, arranged in parallelism substantially within a common plane, to form a sheet-like material impregnated upon one side with a coagulant and to the opposite side of which latex has been applied, as illustrative of the application of the present process to the formation of a sheet material made up of unwoven cords arranged in parallelism and all impregnated with and held in position by the deposit of coagulated latex within and adjacent to the cords.

The present invention is regarded as applicable for use with woven, unwoven, knitted, or other forms of fabric material generally, such as may be made from any animal or vegetable fibers, such, for example, as, cotton, wool, silk, flax, jute, ramie, fur, wood or cellulosic fibers, or other short or long fibered material of a generally similar nature, and the arrangement of the fibers in the material may be regular, as in carded bats, and fabrics containing spun threads, or irregular as in felted or matted materials.

The rubber composition employed may be any natural or prepared coagulatable aqueous dispersion of rubber, including natural latices or those containing coloring matters, vulcanizing agents, accelerators, or other materials or compounds, provided that the materials added do not injuriously affect the latex or the deposited rubber particles and that the coagulating tendencies of the latex have not been inhibited or suspended to such a degree as to prevent or unduly interfere with such coagulative action as normally occurs when natural milk latex is contacted with a coagulating agent.

Any suitable coagulant may be used (of which many are in common use), but I prefer to employ a liquid coagulant such as does not deposit a residue that may necessitate later removal or neutralization, and for this purpose I have found that acetic acid is well adapted for use generally in connection with cotton and like materials when employed in the form of a solution ranging upwards from less than one percent, dependent upon the degree of concentration desired in the deposited rubber and the manner in which I desire to locate the deposited rubber in the material, it being within the purpose and intent of my invention to use this or other coagulating agents in any suitable strengths or concentrations as may be found to be desirable for effecting the character and degree of coagulation sought.

While the present invention is capable of and adapted to be employed in a variety of ways and carried out either manually or by various arrangements of mechanisms, I have indicated in the accompanying drawing certain modes of application which may be employed in connection with various forms of fibrous materials.

In Fig. 1 of the drawing there is shown a portion 1 of a sheet material formed from carded or matted fibers in which the fibers may be loosely arranged as in an uncompressed or nonfelted state. Such a fibrous sheet may first be treated by impregnating the same a certain distance from the under side 2 with a suitable coagulant, as above described, of desired strength, in any suitable manner, as by spraying, by contact with a coagulant carrier or otherwise, to effect the desired degree of penetration, the limit of which in the present case is indicated approximately by the line 3. A suitable rubber latex is then applied to the sheet 1 from the side 4, being substantially evenly distributed throughout the area of the side 4 and deposited thereon in any desired manner, as by a single or successively arranged sprayers or other applicators. The latex is absorbable by such material and when it reaches the area of coagulant penetration, as indicated by the line 3, will immediately commence to coagulate. This coagulative action may proceed upwardly towards the face 4 of the sheet under the influence of the coagulant, and the liquid constituents of the latex tend to separate from the coagulum mainly above the area defined by the line 3. The deposited rubber particles may extend slightly below the line 3 before the progress of the latex is halted by the deposit of rubber particles in a quantity sufficient to prevent further downward penetration by the latex, but the meeting surfaces of coagulant and latex impregnation will define approximately the limit of latex impregnation and in certain cases be characterized by the formation of a substantially continuous compact layer of rubber particles impervious to further penetration by latex. The latex contained in the material above the line 3 may continue to coagulate until the action is substantially complete from the line 3 to the surface 4 of the material.

By absorbing the aqueous dispersion of rubber downwardly into the fibrous mass, either through the action of gravity alone or by the employment of any aids to hasten absorption, while at the same time providing a coagulant impregnated zone below the zone of rubber impregnation a sufficient quantity of deposited rubber particles may be brought into and deposited in the material to build up a highly concentrated rubber deposit extending upwardly through the portion of the fibrous mass above the zone of coagulant impregnation.

The separable liquid constituents of the latex tend to separate from the deposited rubber particles upwardly or away from the coagulant impregnated portion and may be removed by compressing or drying the sheet or in any other suitable manner, when the coagulation is complete or substantially complete. The compression of the sheet, as by rolls or otherwise, also compacts the rubber impregnated fabric in which the rubber particles have been deposited throughout the interstices of the material.

By extending the coagulant impregnation a sufficient distance above the side 2, as indicated by the line 3, and employing suitable percentage strengths of latex and coagulant, desired lengths of fiber nap may be left free from the deposited rubber on the side 2 of the sheet. Through the use of a coagulant solution of appropriate strength a rubber deposit of sufficient density to substantially completely fill the interstices of the fibrous material may be carried to a point substantially above the plane indicated by the line 3, and if desired, additional latex may be deposited upon the face 4 of the sheet to secure an increased thickness of deposited rubber particles within the material.

The process may be carried out by first impregnating a sheet, such as sheet 1, with a coagulant as above described, then impregnating a second sheet, as sheet 7, in a similar manner and from the side 8 thereof to a depth indicated by the line 9, and then superposing sheets 1 and 7 upon each other with the coagulant impregnated sides 2 and 8 in juxtaposition, and with the coagulant free sides 4 and 10 located outwardly of the composite sheet. The composite sheet thus formed may be passed through a rubber latex bath or otherwise treated to effect absorption of latex from the sides 4 and 10 simultaneously. The coagulation of the absorbed latex will take place from each side after the manner previously described in connection with the sheet shown in Fig. 1. Through varying the strength of the coagulant and the degree of penetration of the coagulant the area of initial latex coagulation as defined by the lines 3 and 9 may be brought closer together or separated from each other a greater distance and after the coagulation of the absorbed latex is complete the composite sheet may be compressed or dried or otherwise treated to remove the liquid constituents of the latex from the outer surfaces of the sheet after the manner previously described. The composite sheet may then be separated along line 12 defining the plane of juncture of the sheets 1 and 7, leaving a backing of fibers upon each sheet not impregnated with deposited rubber particles. If desired, and after the completion of the steps above described, additional latex may be applied to that side of sheets 1 and 7 which were initially impregnated with a coagulant, and preferably before complete removal or dispersion of the coagulant initially applied to form another layer of deposited rubber particles substantially contiguous with those formed by the initial contract of the latex applied to the sides 4 and 10. If desired, the process may be carried out by using a fairly strong solution of coagulant and effecting only a slight impregnation of the sides 2 or 8 whereby the initial coagulation of latex absorbed from the opposite sides of the sheets will take place closely adjacent to the lower sides thereof resulting in a more or less complete and continuous formation of deposited rubber particles throughout substantially the entire thickness of the sheet.

In the manner of carrying out the process as previously described in connection with Figs. 1 to 3, it is assumed that a latex relatively high in rubber content is employed, such as, for example, thirty to forty percent, and that the coagulant employed is of sufficiently high percentage strength, as, for example, twenty-five to thirty percent to quickly coagulate all adjacent latex as soon as it comes within the sphere of influence of the coagulant.

If a relatively light or porous deposit of rubber particles within the material is desired, however, a latex having a considerably lower rubber content may be employed, and if the deposited rubber is to extend entirely or substantially entirely through the sheet of material a considerably weaker coagulant may be employed. In such case, the meeting areas of latex and coagulant saturation will not be so clearly defined nor will the plane of their juncture be characterized by as heavy a deposit of rubber particles as when a higher percentage of rubber content is present in the latex and a stronger coagulant is used.

From the above it will be understood that the process lends itself to being carried out in such a manner as to effect a substantially rapid dissipation of the effectiveness of the latex and coagulant interaction, which may be employed to produce a heavy deposit of rubber particles in a predetermined area or zone of the material, or a relatively slow and dispersive action for producing a relatively thin deposit of rubber particles extending throughout a considerable distance or entirely through the material, as well as a variety of intermediate effects between the extremes mentioned.

While, for the purpose of illustration, I have given certain percentages of rubber content in latex and certain percentage strengths of coagulants which may be used, for the purpose of showing how different effects may be produced, it is to be understood that these percentages are in no sense controlling, as they will necessarily vary widely with the character of the fibrous material, the thickness of the sheet, the density of the fibrous mass and the character and quality of the material to be produced. For these reasons the invention is not to be limited in any sense by the percentages given above, since under certain conditions they may well be above or below the percentages given.

In Fig. 4 of the drawing there is shown a portion 18 of a woven fabric sheet to illustrate the application of the process to material of that character. The lower face 19 of the sheet 18 may be impregnated with a suitable coagulant to a depth indicated by the line 20, and latex may then be applied in any suitable manner to the upper face 21 to be absorbed within the interfiber and interstrand spaces and deposited therein when brought into effective contact with the coagulant as along a plane located at or adjacent to that indicated by the line 19. In this case, what is normally the "right" side of the fabric is the side impregnated with the coagulant so that the rubber deposit may be spaced from the surface thereof when deposited within the fabric through the action of the coagulant. In this way after the separation of the liquid constituents of the latex the material may be washed or otherwise treated to remove the excess coagulant, leaving the "right" side of the fabric in its original condition and presenting the same appearance as untreated fabric.

Fig. 5 of the drawing illustrates a method of employing the process in connection with unwoven cords 24, which are arranged in parallelism and located in the form of a sheet in such a manner as to permit the impregnation or partial impregnation of the lower sides 25 with a suitable coagulant capable of penetrating to some extent the cords themselves and the intercord spaces, as, for example, to a plane indicated by the line 26.

A suitable latex or rubber dispersion may then be applied uniformly to the side 27 of the cords to fill the intercord spacing and be absorbed within and between the individual cords sufficiently to contact with and be coagulated by the action of the coagulant applied to the sides 25. In this way a deposit of rubber particles may be formed both substantially within the individual cords as well as within the intercord spaces generally along the areas defining the meeting points of the coagulant and latex, which by suitable proportioning of quantity and strength in the coagulant may provide varying degrees of rubberization both within the individual cords and throughout the spaces separating the cords.

In either case the fluidity of the latex renders it capable of penetrating downwardly into the material and into contact with the coagulant in the coagulant impregnated zone to produce a concentrated deposit of coagulated rubber particles within the body of the material by reason of its application from above and the provision of a coagulant impregnated zone preventing its passage through the material and causing the deposit of the rubber component beginning at a point adjacent to the zone of coagulant impregnation. The formation of the initially coagulated deposit itself serves as a means for arresting the penetration of later absorbed latex and retains it in the material for coagulation in the form of a relatively dense coagulum within the fibrous material to build up a rubber content of high density within the material.

This process in its application to all forms of material and in all modes of its use lends itself to producing the rubber deposit either in a definite zone or zones, or as a diffused deposit within the body of the fibrous material to form with the fibers themselves a substantially coherent mass, making both the rubber and fiber constituents mutually effective for providing strength and elasticity in the material, which qualities may also be controlled, in part at least, by the degree of concentration of the deposit and the percentage of rubber deposited.

The material formed as above described may or may not be vulcanized after the deposit of the rubber particles and the drying of the material. This material is characterized by the fact that the deposited rubber formed in this manner tends to resist deterioration and that by the application of a lacquer coating to the surface or surfaces of the material the lacquer coating is bonded to the rubber deposit which is preserved more or less indefinitely without vulcanization and retains its flexibility without noticeable diminution, and also tends to increase and preserve the flexibility of the lacquer coating as well. The effect of this material upon a lacquer coating applied thereto in maintaining and preserving as well as increasing the flexibility and live qualities of the lacquer coating is thought to be an entirely novel effect and indicates the exceptional preservative qualities possessed by latex rubberized material formed in this manner. If desired, also, the material may be covered upon one or both sides with a lacquer coating in which is contained suitable vulcanizing agents, and vulcanization of the rubber content of the material may be effected through contact with the bonded lacquer coating.

In general, any of the rubber treated material formed as above described may be treated after the deposit of the rubber particles and the drying of the material by applying to one or both sides thereof an additional coating of what may be termed surface deposited rubber bonded to the fibers and/or the deposited rubber, or by a coating of gums or lacquers, with or without fillers, each firmly adherent to the sheet material.

In the use of the terms "latex" or "rubber latex" in the specification and claims reference is made to either a natural milk latex or to any one of a variety of specially prepared latices suitable for the purpose, or to latices containing in addition to their natural constituents such materials as vulcanizing agents, accelerators, wetting agents, coloring materials, fillers and the like as may be found suitable for the production of the type and character of material which it may be desired to produce, it being understood that the process lends itself to the production of products possessing a wide range of different characteristics.

When necessary or desirable, the fibrous material may be pretreated with a suitable wetting agent such as Igepon or the like, or such agent may be added to the latex before it is applied to the material in order to facilitate obtaining the desired degree of penetration by the latex. The wetting agent used may be one having a substantially neutral pH in order to avoid increasing the alkalinity of the latex and thereby slowing up the coagulation.

What I claim is:

1. The method of forming a rubberized sheet material which comprises, depositing rubber particles from an aqueous dispersion of relatively high concentration to a predetermined depth within a sheet of fibrous material from one side thereof through partially impregnating the fibrous material with a coagulant to initiate the deposition of the rubber particles at a point within the material, and then applying an aqueous dispersion of rubber containing a relatively low percentage of rubber to the opposite side of said sheet to form rubberized layers of different densities through the sheet material.

2. The method of rubberizing a sheet of fibrous material which comprises, applying an aqueous dispersion of rubber to one side of the sheet material, coagulating said aqueous dispersion of rubber from a point within the material and outwardly therefrom in the direction of its application, then applying an aqueous dispersion of rubber to the opposite side of said sheet and coagulating the same outwardly from a point at or adjacent to the point of initiation of coagulation of the rubber dispersion first applied and in the opposite direction.

3. The method of depositing rubber from a coagulative aqueous dispersion of rubber within the body of a fibrous sheet material which comprises, partially impregnating the fibrous material from one side with a rubber coagulant, applying a coagulative aqueous dispersion of rubber to the upwardly positioned coagulant free face of the partially impregnated material for movement downwardly therethrough into contact with the coagulant to form a deposit of the rubber constituents of the aqueous dispersion within the material solely through coagulation of the rubber component of the aqueous dispersion within the material, whereby the coagulation of the aqueous dispersion of rubber in the material continues upwardly from the initial rubber deposit.

4. The method of depositing rubber from an aqueous dispersion of rubber in a fibrous material which comprises, providing a coagulant impregnated zone at a desired location within a portion of the material having a coagulant free zone extending upwardly therefrom, and then applying a coagulative aqueous dispersion of rubber downwardly through the coagulant free zone and into contact with the coagulant impregnated zone to form a deposit of coagulated rubber particles within the body of the material and at a position therein determined substantially by the location of the coagulant impregnated zone.

5. The method of depositing rubber within a sheet of fibrous material which comprises, impregnating one side of the sheet of fibrous material with a coagulant to form a coagulant impregnated zone extending partially through the thickness of the sheet and leaving a substantially coagulant free zone upon the other side of the sheet, maintaining the sheet of fibrous material substantially horizontal with the coagulant free side thereof uppermost, applying an aqueous dispersion of rubber to the coagulant free side of said fibrous material while the fibrous material is maintained substantially horizontal and into contact with the coagulant therein to provide an interfiber deposit of coagulated rubber particles extending outwardly towards the upper surface of the sheet material from the zone of coagulant impregnation.

6. The method of permeating a portion of a fibrous sheet material with a heavy deposit of rubber particles from latex which comprises, impregnating one side of the fibrous sheet material with a coagulant while leaving the opposite sides thereof substantially free of coagulant, maintaining the sheet material substantially horizontal with the coagulant free face thereof uppermost, applying latex to the upper face of the sheet material in sufficient quantity to permeate that portion of the sheet above the zone of coagulant penetration with deposited rubber while coagulation of the applied latex is effected initially adjacent to the zone of coagulant impregnation and continued upwardly of the material to the upper face thereof while the sheet is maintained substantially horizontal to retain the latex in the material until the coagulation of the rubber constituent thereof is substantially complete.

7. The method of depositing rubber particles within the body of a fibrous material which comprises, impregnating a portion only of the fibrous material from one side with a coagulant to form a zone of coagulant impregnation within the material, applying rubber latex to a portion of the fibrous body upon the side opposite to that to which the coagulant was applied and located outwardly of and above the zone of coagulant impregnation for movement downwardly into contact with the coagulant in the zone of coagulant impregnation to deposit the rubber constituents of the latex in the fibrous material, and retaining the applied latex within the fibrous material until the coagulation of the rubber constituents thereof is substantially complete.

8. The method for forming a rubberized sheet material which comprises, partially impregnating a sheet of fibrous material with a coagulant from one side thereof only, and separately applying an aqueous dispersion of latex to opposite sides of the sheet of fibrous material to form deposits of rubber particles separately in areas located within and adjacent to opposite sides of the sheet material.

9. The method of forming a rubberized sheet material which comprises, impregnating one side of the fibrous sheet material with a coagulant to form a coagulant impregnated zone extending throughout a portion only of the thickness of the sheet material and a substantially coagulant free zone, applying an aqueous dispersion of rubber to the opposite side of said sheet material for penetration through the said coagulant free zone into contact with the coagulant impregnated zone, reversing the sheet to bring the opposite side thereof uppermost, and applying an aqueous dispersion of rubber to the substantially rubber free side of the sheet for penetration downwardly towards the first applied rubber.

10. The method of depositing rubber particles within the body of a fibrous material which comprises, impregnating the fibrous material to a limited extent and from a definite surface area only with a coagulant to provide a coagulant containing zone and a substantially coagulant free zone within the material, applying an aqueous dispersion of rubber to a portion of the surface of said substantially coagulant free zone for absorption through said substantially coagulant free zone and into contact with the coagulant in the coagulant impregnated zone.

11. The method of rubberizing a sheet of fibrous material through a controlled application of an aqueous dispersion of rubber and a coagulant thereto which comprises, applying a coagulant in controlled quantity to one side only of the sheet, applying a controlled quantity of an aqueous dispersion of rubber to the opposite side only of the sheet, whereby penetration of the sheet material both by the coagulant and the aqueous dispersion of rubber is limited substantially to paths of travel at substantially right angles to the plane of the sheet.

12. The method of rubberizing a sheet of fibrous material which comprises, applying a coagulant to the under surface of a sheet of fibrous material for absorption upwardly into the fibers of the material, and applying an aqueous dispersion of rubber to the opposite side of said sheet material for penetration into the material through the action of gravity whereby the aqueous dispersion of rubber is brought into effective contact with the coagulant at a point within the material to form a deposit of coagulated rubber within the body of the fibrous sheet material.

EDWARD F. KING.